United States Patent [19]

Cothran et al.

[11] Patent Number: 4,872,629
[45] Date of Patent: Oct. 10, 1989

[54] ADJUSTABLE ANCHOR BRACKET FOR NON-INVASIVE ATTACHMENT TO MASONRY WALL

[76] Inventors: Michael W. Cothran, 1880 Wrondel Way, Reno, Nev. 89502; Alvin T. Nelson, III, 2249 Old Creek Cir., Pittsburg, Calif. 94565

[21] Appl. No.: 242,557
[22] Filed: Sep. 12, 1988
[51] Int. Cl.⁴ .............................................. A47B 96/00
[52] U.S. Cl. .............................. 248/231.2; 248/231.91
[58] Field of Search ............... 248/231.2, 231.4, 231.6, 248/231.91, 316.4, 316.2, 217.2, 221.4, 222.1; 52/27, 698

[56] References Cited

U.S. PATENT DOCUMENTS 2,471,584  5/1949  Richards ........................ 248/231.91
3,015,897  1/1962  Hopp ............................ 248/222.1 X
3,189,187  6/1965  Guyer, Jr. et al. .......... 248/222.1 X
4,049,230  9/1977  Minniear ...................... 248/222.1 X
4,121,803 10/1978  Garrick ........................ 248/231.6 X
4,145,840  3/1979  Davidson ..................... 248/231.2 X

*Primary Examiner*—Ramon O. Ramirez
*Attorney, Agent, or Firm*—John J. Leavitt

[57] ABSTRACT

Presented is an anchor bracket that constitutes a pair of monolithic blocks that are slidably related one to the other for adjustment between a minimum depth dimension and a maximum depth dimension, the blocks being separated or collapsed by manipulation of a set-screw threadably engaging one of the blocks and impinging against the other block. A machine screw is adjustably engaged with one of the blocks and forms a projection from which an article may be suspended.

8 Claims, 1 Drawing Sheet

ADJUSTABLE ANCHOR BRACKET FOR NON-INVASIVE ATTACHMENT TO MASONRY WALL

BACKGROUND OF THE INVENTION

1. Field of the Invention

This invention relates to anchor brackets on which articles may be suspended, and particularly to such an anchor bracket adapted for detachable attachment to the masonry units on opposite sides of the mortar joint in a masonry wall.

2. Description of the Prior Art

The prior art relating to this invention is believed to be found in Class 248, and sub-classes 217.2; 221.4; 222.1; 231.2; 231.9 and 231.91. A preliminary patentability and novelty search in this area revealed the existence of U.S. Pat. Nos. 3,015,897; 3,071,350; 3,189,187; 4,049,230 and 4,145,840.

Referring to the patents noted in the order of their issuance, U.S. Pat. No. 3,015,897 relates to a device for supporting a display, the support structure constituting two legs, pivoted at one end, and having a threaded screw disposed between the two legs intermediate their ends. The threaded screw is threadably engaged with one of the legs and works to separate the ends of the legs to thus anchor the legs in a support structure. While this structure might perform substantially the same function as performed by the subject matter of this invention, it is completely different in it's construction.

U.S. Pat No. 3,071,350 is directed to a structure for detachably mounting a handrail to a support structure.

U.S. Pat. No. 3,189,187 relates to a device for extending a shelf, and provides a connection member having two spaced legs arranged in a triangular pattern with a screw threaded in one of the leg members and adapted to press outwardly on the other to thus lock the free ends of the triangular shaped bracket under the projecting lips of the support structure.

U.S. Pat. No. 4,049,230 relates to a bracket device that utilizes two juxtaposed plates having notches adjacent one end but facing in opposite directions. The plates are pivotally interconnected and are adapted to be spread apart by rotation of a screw. When the screw is rotated, the two juxtaposed plates are spread apart so that the notches engage the inner periphery of a hole in a supporting plate.

Lastly, U.S. Pat. No. 4,145,840 relates to a fastening device that is designed specifically for use in substantially the same environment in which the subject matter of the present invention is adapted for use, namely, the mortar joint in a masonry wall. However, while there might be conceptual similarity regarding the end result to be performed, the structures utilized are very different. Here, a triangular member formed from spring steel is provided with opposed legs the ends of which are turned outwardly and are provided with sharp points that engage the opposed surfaces of the masonry units on opposite sides of the mortar joint. Engagement of the sharp points with the surfaces of the masonry units is effected by the inherent resilience of the spring steel from which the clip is fabricated.

In modern day architecture, masonry of different types has been used to fabricate entire walls and even multiple walls in residences and in commercial buildings. The use of masonry for walls creates the problem of attachment of decorative articles on the masonry wall. Most decorative articles that are suspended on walls are changed from time to time and it is desirable that the method of suspending these decorative articles on the wall be non-invasive to the wall in the sense that it is preferable that the wall not be marred by drilling holes in the masonry wall. It is of course true that even if holes are bored in the masonry wall, the holes can be filled with an appropriate filler, but this usually entails the employment of an expert mason, with attendant costs, and runs the risk that the repaired area will not match the remaining color and texture of the masonry wall. Accordingly, an important object of this invention is the provision of a device that may be non-invasively attached to a masonry wall, particularly a brick wall.

In the construction of masonry walls, it is the custom that the mortar joint between masonry units be recessed somewhat below the surface of the masonry unit so as to provide a decorative relief to the masonry wall. Such custom thus leaves exposed a narrow edge of the masonry units. Therefore, another object of this invention is the provision of an adjustable anchor bracket that may be non-invasively attached in the mortar joint by taking advantage of the projecting edges of adjacent masonry units.

Still another object of the invention is the provision of an adjustable anchor bracket for non-invasive attachment to a masonry wall which, when loaded with an article suspended thereon, functions to effect a tightening of the bracket on the wall to thus increase the reliability of the bracket for the suspension of heavy articles thereon.

The invention possesses other objects and features of advantage, some of which, with the foregoing, will be apparent from the following description and the drawings. It is to be understood however that the invention is not limited to the embodiments illustrated and described, since the invention may be embodied in various forms within the scope of the appended claims.

SUMMARY OF THE INVENTION

In terms of broad inclusion, the adjustable anchor bracket for non-invasive attachment to a masonry wall comprises a pair of elongated and juxtaposed metallic blocks that lie parallel to one another, and which are joined by a pair of pins on which one or both of the blocks are slidably related so that one block may be moved in relation to the other between a first position in which the blocks lie contiguous to each other to a second position in which the blocks are spaced from one another yet held parallel by the pins. Mounted in one of the blocks is a threaded ram that extends angularly through the block in which it is mounted, and which abuts the lower surface of the associated block adjacent the rear face thereof and which, when advanced, imposes a separating force thereon, causing the blocks to separate. Means are also provided on one of the blocks for suspending an article to be suspended on the bracket.

DESCRIPTION OF THE PREFERRED EMBODIMENT

Figures 1, 2:
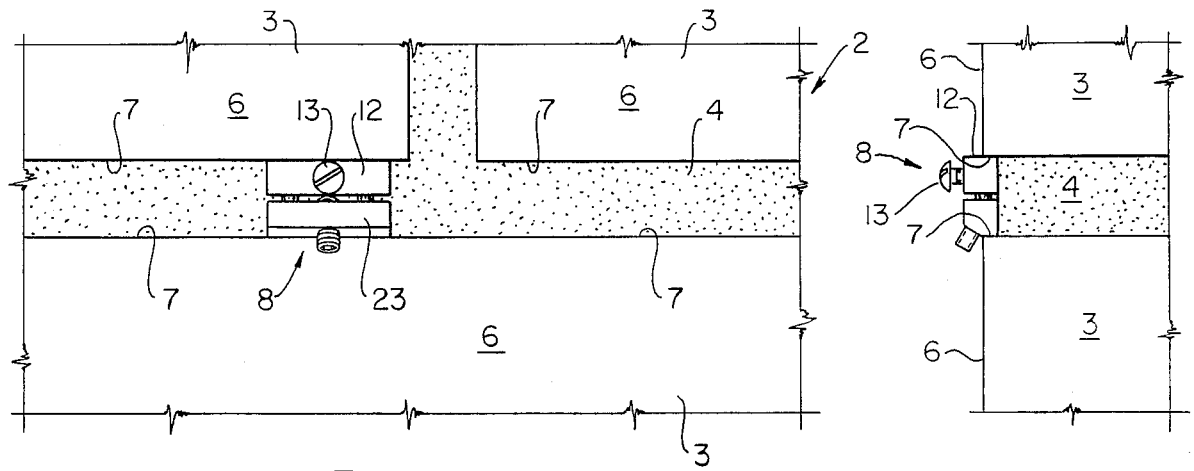
FIG. 1 is a front elevational view of a portion of a masonry wall illustrating the adjustable anchor bracket attached non-invasively to the masonry wall.
FIG. 2 is an end elevational view of the portion of masonry wall illustrated in FIG. 1, and illustrating the manner of attachment of the bracket to the masonry units.
Figure 3:
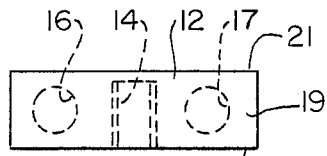
FIG. 3 is a top plan view of the uppermost block forming a part of the anchor bracket apart from other structure.
Figure 4:
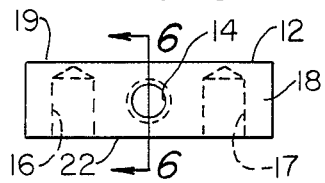
FIG. 4 is a front elevational view of the uppermost block forming a part of the anchor bracket.
Figure 5:
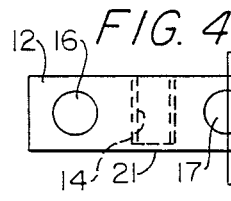
FIG. 5 is a bottom plan view of the uppermost block forming a part of the anchor bracket.
Figure 6:
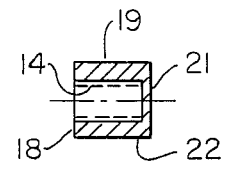
FIG. 6 is a vertical sectional view taken in the plane indicated by the line 6—6 of FIG. 4.
Figure 7:
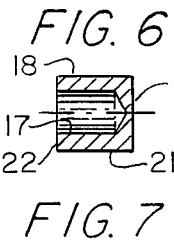
FIG. 7 is a vertical sectional view taken in the plane indicated by the line 7—7 in FIG. 5.
Figure 8:
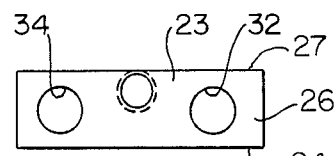
FIG. 8 is a top plan view of the lowermost block of the adjustable anchor bracket shown apart from other structure.
Figure 9:
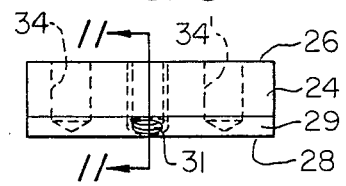
FIG. 9 is a front elevational view of the lowermost block forming a part of the adjustable anchor bracket.
Figure 10:
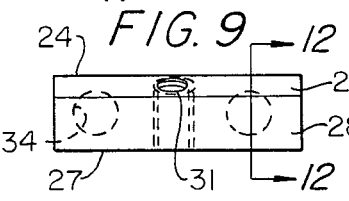
FIG. 10 is a bottom plan view of the lowermost block forming a part of the adjustable anchor bracket.
Figure 11:
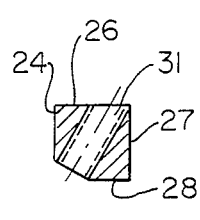
FIG. 11 is a vertical sectional view taken in the plane indicated by the line 11—11 in FIG. 9.
Figure 12:
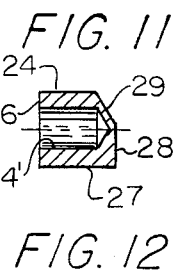
FIG. 12 is a vertical sectional view taken in the plane indicated by the line 12—12 in FIG. 10.
Figure 13:
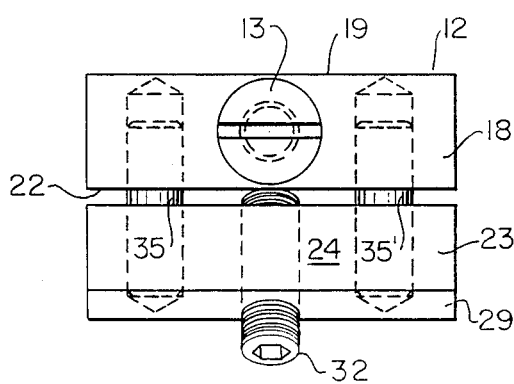
FIG. 13 is a front elevational view of the adjustable anchor shown apart from any supporting structure. The view is shown approximately three times actual size.

In terms of greater detail, the adjustable anchor bracket for non-invasive attachment to a masonry wall and forming the subject matter of this invention is particularly useful for attachment of heavy objects or articles, such as clocks or paintings, or other wall decorative type articles, to masonry walls in which masonry units are spaced apart by a mortar joint in such a way that the mortar is slightly recessed below the level of the masonry unit. Referring to FIG. 1, there is there illustrated a portion of a masonry wall designated generally by the numeral 2, and including in this instance masonry units 3 in the form of bricks, separated and adhered together into a monolithic unit by a layer of mortar 4. It will be seen from FIGS. 1 and 2 that the bed of mortar 4 is recessed below the faces 6 of the masonry units, thus providing surface portions 7 of opposed masonry units or bricks that are spaced apart the thickness of the mortar joint and which provide opposed parallel flat surfaces to which the adjustable anchor bracket designated generally by the numeral 8 may be attached as illustrated. The adjustable anchor bracket illustrated in FIGS. 1 and 2 is illustrated at approximately actual size for a bracket adapted to be utilized in conjunction with a mortar joint that is approximately one-half inch thick. Testing of a prototype of the adjustable anchor bracket in the size illustrated in FIGS. 1 and 2 has indicated that such a bracket, of such size, can easily suspend at least a two-hundred pound weight.

As illustrated in FIGS. 1, 2, 13 and 14, the anchor bracket includes a first (upper) elongated monolithic block 12, formed from a metal bar, and having threadably and adjustably engaged therein a machine screw 13. The machine screw is threaded into a complementarily threaded bore 14 as illustrated in FIGS. 3 through 6. The monolithic block 12 is also provided with two spaced bores 16 and 17 having smooth interiors and which extend into the monolithic block 12 perpendicular to the bore 14, and spaced on opposite sides thereof as illustrated. The monolithic block 12 as illustrated in FIGS. 3 through 7, is provided with a front face 18, a top face 19, a rear face 21, and a bottom face 22. It is noted that the bores 16 and 17 project into the monolithic block 12 through the bottom face 22, while the bore 14 that receives the suspension screw 13 extends into the monolithic body through the front face 18.

The anchor bracket is also provided with a second (lower) monolithic block 23 the detailed structure of which is illustrated in FIGS. 8 through 12, inclusive. As there shown, the monolithic block 23 comprises an elongated metal bar similar to the elongated metal bar from which the monolithic block 12 is formed, both the monolithic blocks 12 and 23 being fabricated conveniently from aluminum bar stock, but obviously being manufacturable from many other materials. The second monolithic block 23 includes a front face 24, a top face 26, a rear face 27, and a bottom face 28. Between the front face 24 and the bottom face 28, the corner of the block is chamfered to provide a surface 29 that is angularly disposed to both surfaces 24 and 28 at about a 45 degree angle.

Figure 14:
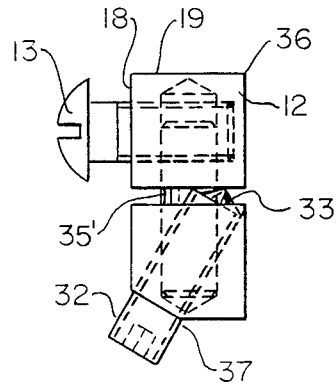
FIG. 14 is an end elevational view of the adjustable anchor bracket illustrated in FIG. 13. The view is illustrated approximately three times actual size.

Bored generally diagonally through the monolithic block 23 at about its mid-point, is a threaded bore 31 adapted to receive therewithin a complementarily threaded set-screw 32, the axis of the set-screw and the bore 31 through which it extends being substantially perpendicular to the angled surface 29 as shown. The set-screw 32 is of sufficient length to extend completely through the block as illustrated in FIG. 14, the inner end 33 of the set-screw abutting against the under surface 22 of the superimposed monolithic block 12.

Also formed in the monolithic block 23 are a pair of spaced smooth bores 34 and 34' having the same diameter as the bores 16 and 17 in the monolithic block 12, and being spaced apart in relation to a median plane to the same degree as the bores 16 and 17. Thus, when the two monolithic blocks 12 and 23 are juxtaposed with the lower surface 22 of the block 12 contiguous with the upper surface 26 of the block 23, the bores 16 and 17 are in axial alignment with the bores 34 and 34' of the second monolithic block 23, and the pairs of opposed cores 16, 34 and 17, 34 slidably receive a pair of metal guide pins 35 and 35', the opposite ends of which project into the corresponding aligned bores so that when the screw 32 is rotated to advance the screw through the block 23, the upper end 33 of the set-screw 32 impinges against the lower surface 22 of the first and superimposed block 12, causing the block 12 to move away from the block 23. In such movement, parallelism between the two blocks is maintained by the guide pins 35 and 35'.

We have found that even if the exposed surfaces 7 of opposed masonry units are as narrow as one sixteenth of an inch, the anchor bracket of this invention is effective for attachment to the masonry wall, and is effective to support incredibly high loads. It is believed that the reason that the anchor bracket is capable of supporting such heavy loads, is that the downward force of the load imposed on the screw 13 (FIG. 14) imposes a rotary moment of force on the anchor bracket that causes the upper rear edge portion 36 of the anchor bracket to tend to be pulled counter-clockwise about the lower edge 37 as an axis of rotation. Since the slant height between the rotational axis 37 and the rear corner 36 of the anchor bracket is longer than the vertical height between the rotational axis 37 and the top surface 19, it is apparent that the rotational moment imposed on the anchor bracket by a load suspended thereon causes the upper rear surface portion 36 of the monolithic block 12 to press more tightly against the associated surface 7 of the masonry unit to which it is attached. Therefore, the limit of the weight that the anchor bracket may reliably suspend is related to the compressibility and shear strength of the masonry material to which the anchor bracket is abutted.

While we have illustrated an anchor bracket that is only approximately three-quarters of an inch long, and adjustable from a depth less than one-half inch to a depth greater than one-half inch, such a bracket has successfully and reliably suspended weights of over two-hundred pounds. The adjustable anchor bracket of the invention is thus admirably suited for non-invasive attachment to masonry walls for the support of much lighter loads such as decorative wall hangings.

Having thus described the invention, what is claimed to be new and novel and sought to be protected by Letters Patent of the United States is as follows:

1. An adjustable anchor bracket adapted for non-invasive detachable attachment in the mortar joint of a masonry wall, comprising:
   (a) a first monolithic body member;
   (b) a second monolithic body member parallel to said first monolithic body member and selectively movable toward or away from said first monolithic body member between a first dimension in which said first and second monolithic bodies are contiguous and project a combined thickness less than the width of a mortar joint to a second dimension in which said first and second monolithic bodies press tightly against the masonry units on opposite sides of the mortar joint when applied thereto; and
   (c) means adjustable disposed between said first and second monolithic bodies selectively manipulable to move said first and second monolithic bodies from said first dimension to said second dimension;
   (d) said first and second monolithic bodies being each provided with corresponding front and rear faces and top and bottom faces connecting said front and rear faces, said rear faces lying recessed in said mortar joint when said bracket is applied to said masonry wall and the top face of said first monolithic body and the bottom face of said second monolithic body detachably engaging the associated surfaces of the masonry units on opposite sides of said mortar joint when said bracket is attached to said masonry wall.

2. The combination according to claim 1, in which said means adjustably disposed between said first and second monolithic bodies and selectively manipulable to move said bodies between said first dimension and said second dimension comprises a ram.

3. The combination according to claim 2, in which guide means are provided operatively interposed between said first and second monolithic bodies operable to maintain the parallel relationship of said first and second monolithic bodies as they are moved between said first and second dimensions.

4. The combination according to claim 1, in which means are provided on one of said first or second monolithic bodies on which an article may be suspended when said anchor bracket is non-invasively attached to a masonry wall.

5. The combination according to claim 2, in which said ram comprises a threaded screw threadably mounted in one of said first or second monolithic bodies and adapted to be retracted away from the other monolithic body to achieve said first dimension, and advanced against said other monolithic body to achieve said second dimension.

6. The combination according to claim 1, in which guide means are provided operatively interposed between said first and second monolithic bodies operable to maintain the parallel relationship of said first and second monolithic bodies as they are moved between said first and second dimensions, said guide means comprising a pair of spaced pins slidably disposed in associated bores formed in mutually facing surfaces of said first and second monolithic bodies.

7. The combination according to claim 5, in which said threaded screw is threadably mounted in said second monolithic body and abuts said first monolithic body whereby rotation of the screw in one direction retracts the screw away from said first monolithic body, while rotation of the screw in the opposite direction effects abutment of the screw against said first monolithic body.

8. The combination according to claim 7, in which said screw penetrates said second monolithic body at an angle and abuts said first monolithic body.

* * * * *